Apr. 3, 1923.

W. HAHNEMANN

SUBMARINE SIGNALING APPARATUS

Filed Jan. 5, 1921      3 sheets-sheet 1

Inventor:
Walter Hahnemann
By:
Knight Bro
Attorneys

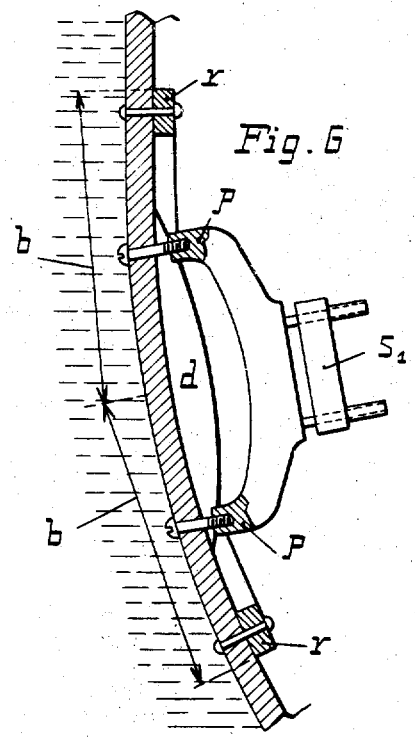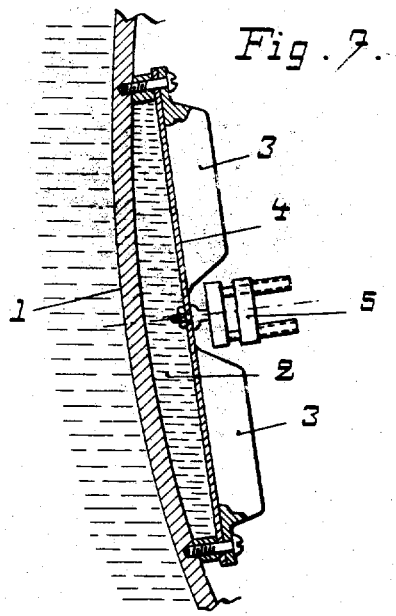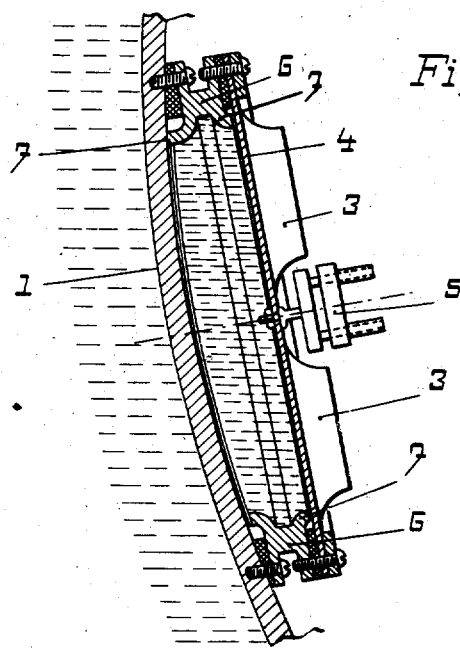

Apr. 3, 1923.
W. HAHNEMANN
1,450,287
SUBMARINE SIGNALING APPARATUS
Filed Jan. 5, 1921  3 sheets-sheet 3
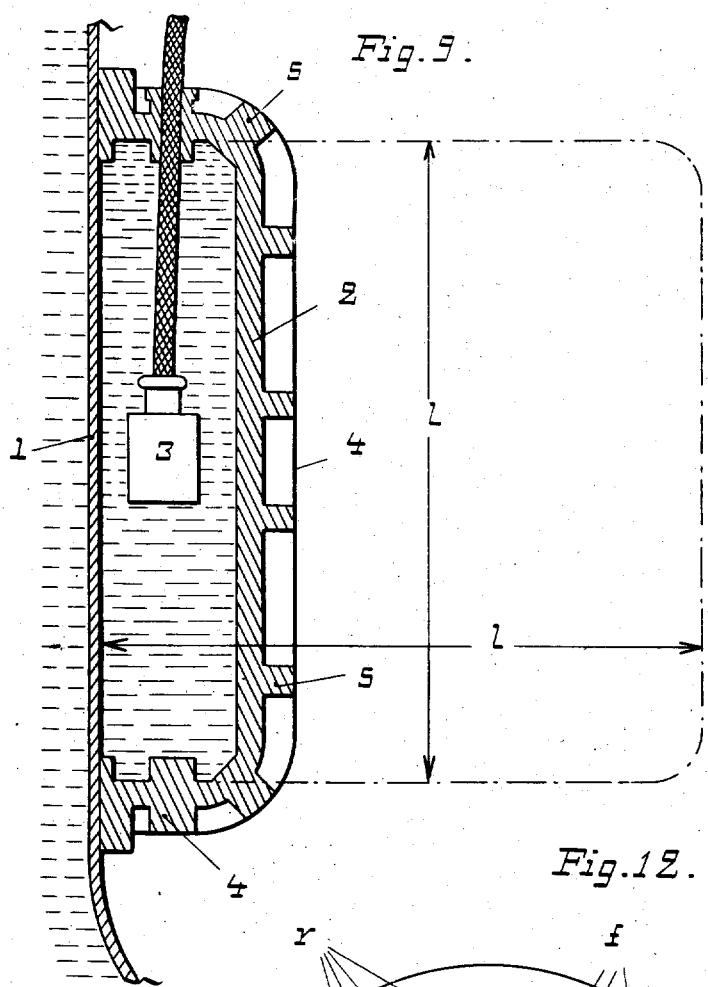
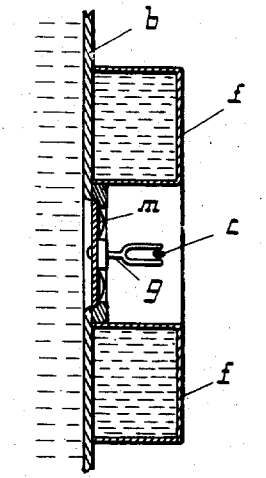
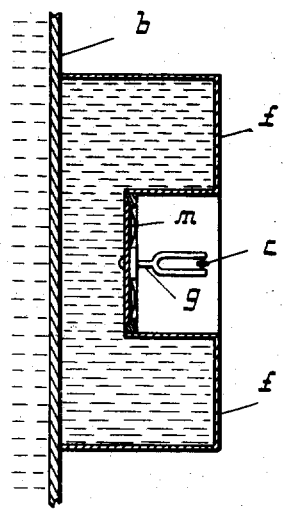
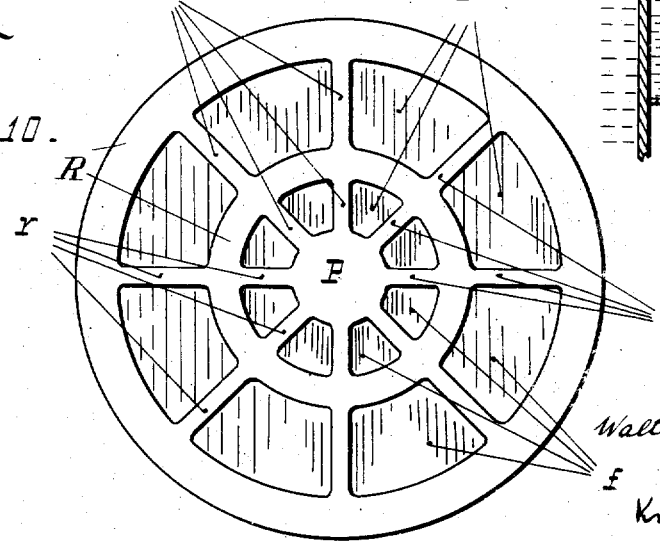
Inventor:
Walter Hahnemann
By:
Knight Bros
Attorneys Patented Apr. 3, 1923.

1,450,287

UNITED STATES PATENT OFFICE.

WALTER HAHNEMANN, OF KITZEBERG, NEAR KIEL, GERMANY, ASSIGNOR TO THE FIRM SIGNAL GESELLSCHAFT M. B. H., OF KIEL, GERMANY.

SUBMARINE SIGNALING APPARATUS.

Application filed January 5, 1921. Serial No. 435,294.

(GRANTED UNDER THE PROVISIONS OF THE ACT OF MARCH 3, 1921, 41 STAT. L., 1313.)

*To all whom it may concern:*

Be it known that I, WALTER HAHNEMANN, citizen of the German Republic, and residing at Kitzeberg n. Keil, county of Schleswig Holstein, Germany, have invented certain new and useful Improvements in Submarine Signaling Apparatus (for which I have filed applications in Germany on August 24, 1915, Patent No. 303,209; on September 14, 1915; on October 23, 1915, Patent No. 310,726; on November 1, 1915; on November 29, 1915, Patent No. 310,727; on February 8, 1916, Patent No. 305,659; in Sweden on June 28, 1920; in Norway on June 28, 1920; in France on July 6, 1920; in Italy on July 10, 1920; in Denmark on July 21, 1920, and in Holland on September 9, 1920), of which the following is a specification.

This invention relates in general to submarine signaling plants and more particularly to improvements by which the efficiency of such plants can be considerably increased.

To facilitate the proper understanding of the invention the following prefatory explanation will be given: The particles engaged in propagating sound are subject to motion and pressure. Apart from certain special instances the pressure and motion of a certain element of a homogeneous medium in which a sound wave travels are displaced with respect to each other by 90°. The absolute values of the two factors or elements by which the sound energy propagated in different media is mathematically represented vary considerably according to the compressibility of the media and the densities thereof. If a comparison is drawn between water and air it is found that in water relatively very small amplitudes of motion are accompanied by very large amplitudes of pressure, whilst in air it is just the opposite.

An effect of this small compressibility of water, and of the resultant high pressures caused in water by sound waves, is that surfaces or substances of objects that are almost entirely rigid or unyielding to pressure engendered by air sound waves behave like soft or flexible bodies when acted upon by water sound waves.

A surface or wall which acts as an excellent reflector of air sound waves might give way or yield to water sound waves impinging upon it and thus fail to reflect them. If a wall of this kind forms a partition between a volume of water and a volume of air and happens to be situated in the neighborhood of a sound signaling apparatus intended to receive or produce sound waves, the wall will afford the sound waves an opportunity of deviating or bending away from the sound signaling apparatus, so that only a small percentage of the energy embodied in the waves will actually take effect on the sound signaling apparatus itself.

In practice these conditions will nearly always exist, because submarine sound signaling apparatus are nearly always installed in ships, buoys and the like. The vibrating elements of the signaling apparatus are attached to or combined with the walls of the vessels and these walls either operate to radiate the sound energy themselves, or special sound radiating members or radiators are inserted in the walls or arranged near them.

The area over which the above described deleterious action of yielding parts extends, is confined to narrow limits. As shown by the theory of sound a vibrating body situated or submerged in a medium in which a sound is propagated is at all times directly subjected to only such a volume of the said medium as occupies the space of a sphere having a radius equal to half a wave length of the sound in question. Yielding parts (i. e., such parts as give way to the compressional waves), that are a greater distance away from the vibrating elements of the sound apparatus than that defined by the said sphere are of no practical importance. Thus in the case of a radiating diaphragm the deleterious reaction upon the sending or receiving sound signaling device of flexible parts in any zone that is further from the centre of the diaphragm than a half of a wave length is negligible.

The invention consists in providing an arrangement constructed with due regard to the above considerations, i. e., all parts of the area or wall arranged around the sound receiving or producing apparatus proper, and that are situated within a zone having a radius equal to one half of the wave length of the sound employed, are rendered inflexible to the sound waves by some suitable means. The rate of vibration of the sound employed will be that of the sound used for signaling purposes, and in the case of tuned sound signaling apparatus the signaling frequency will be determined by the frequency of resonance of the tuned apparatus. Although the full effect is only obtained if the inflexible zone is made to extend over an area of the size described above, it has been found by theory and confirmed by experiment that to accomplish satisfactory results it suffices if the area of the inflexible zone is such that its radius is equal to a quarter of a wave length of the sound used for signaling.

The means that may be employed for producing an inflexible surface are: (1) The thickening of the wall or plate against which the sound waves impinge in the zone in question, (2) the application of stiffening members or ribs, or (3) lining or covering the plate with a medium that is practically as incompressible as water, or preferably with water itself. These three different means are perfectly equivalent as to the results achieved and may be combined at will. The choice of the particular means employed depends in each individual case upon the other points that have to be considered in designing the plant, as will be explained below in reference to specific cases.

A few examples of applications of the invention are the following:

If it is a question of imparting a certain direction to a train of waves, for example, if it is desired to concentrate the wave train upon a sound signaling apparatus that is arranged in water before a reflecting surface, or if sound waves emitted by the submerged sound signaling apparatus are to be diverted by the reflecting surface or wall into a particular direction, this wall should be constructed in accordance with this invention.

If a vibrating sound receiving or sound emitting diaphragm of moderate size is inserted in a wall such as a thin hull which is soft or flexible with respect to water sound waves, so that parts of the soft wall lie within the quarter wave length zone, these parts must be made rigid or inflexible by some suitable means.

If the composition of the vibrating diaphragm itself is such that its parts give rise to superimposed oscillations and enable the compressional sound waves to deviate from the paths in which they would produce the greatest effect, the diaphragm must be stiffened so as to suppress these superimposed oscillations.

The invention is illustrated in the drawing in which

Figure 3:
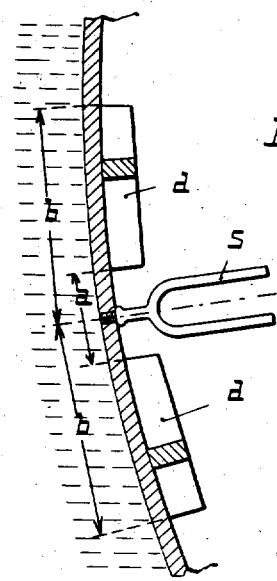

Fig. 3 represents a vertical section of a sound signaling arrangement in which a sound producing tuning fork is mounted on the hull of a ship so that the stem of the fork causes the hull to vibrate. The part of the hull at the foot of the tuning fork acts as a sound radiating member, whilst the region surrounding the radiating portion of the hull is rendered inflexible or rigid with respect to sound waves by strengthening ribs.

Figure 4:
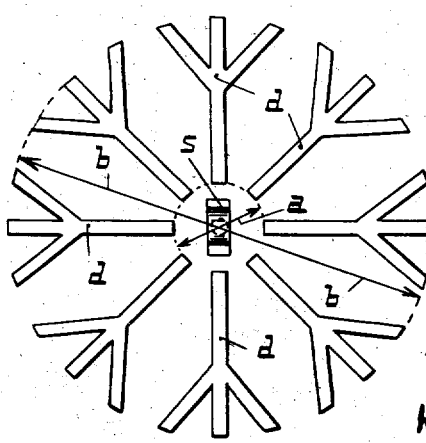

Fig. 4 is a front view of the arrangement of Fig. 3 showing the layout of the strengthening or stiffening ribs.

Figure 5:
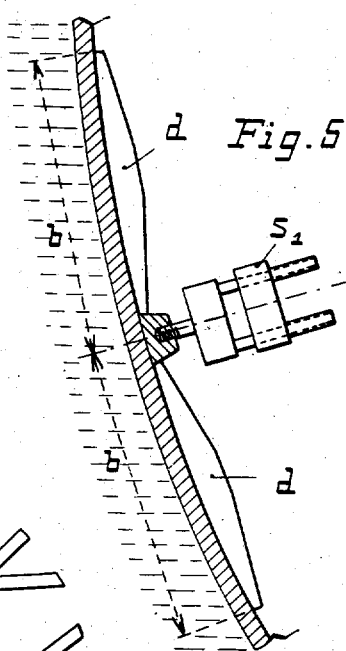

Fig. 5 shows an example in which a part of a ship's hull, having a diameter equal to one half of the length of a wave of the sound produced, is itself used as a sound radiating member and is equipped with stiffening ribs that compel all its parts to always move in the same direction at any particular moment.

Fig. 6 illustrates a similar arrangement to that shown in Fig. 5 except that the form of the stiffening ribs is such that the radiating portion of the hull executes oscillations whose shape corresponds more nearly to the natural form of oscillations executed by vibrating diaphragms.

Fig. 7 shows an arrangement in which a vibrating plate of the kind represented in Fig. 5 is coupled with the hull of a ship by a layer of liquid.

Fig. 8 represents a modification of the arrangement of Fig. 7 in which the soft parts formed by the packing used for sealing purposes in the water tank are separated from the sound conducting chamber by interposed curved metal members or rings.

Fig. 9 shows a device in which the sound signaling apparatus is arranged in the interior of a water tank whose walls are provided with stiffening ribs in accordance with the invention, the tank being mounted on the inner wall of a ship's hull.

Fig. 10 represents a specific method of arranging the stiffening members upon a vibrating wall or plate.

Fig. 11 illustrates a device which is fundamentally similar to that of Fig. 5 but in which the stiffening ribs are substituted by a ring-shaped water vessel.

Fig. 12 shows an arrangement that corresponds to Fig. 11 except that the vibrating diaphragm proper is coupled with the hull by an interposed liquid.

Figure 1:
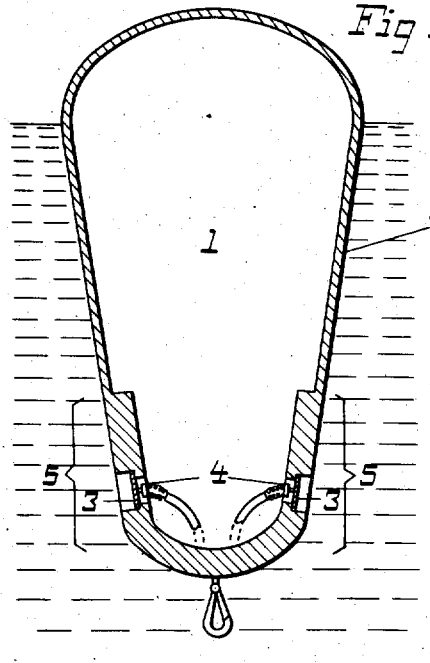
Fig. 1 shows a sound signaling device combined with a buoy, the wall of the buoy being thickened in the neighborhood of the sound receiving diaphragm.

Fig. 1 represents a buoy 1 having a wall 2 which, in general, is of ordinary thickness. Arranged at the lower part of the buoy are two submarine sound receivers each consisting of a diaphragm 3 and a microphone 4. The part of the buoy wall that is in the neighborhood of the receiver diaphragms, i. e., the zone indicated by 5 is made much thicker than is necessary for resisting the static pressure of the water.

An arrangement of this kind operates as follows: The sound waves propagated in the water and arriving at the buoy impinge upon all submerged points of the latter in the same way as upon the receiving diaphragm. If, as is generally the case, all submerged parts of the wall of the buoy were made of thin metal these parts would not remain rigid to the sound waves, but would yield thereto and thus absorb or dissipate a considerable amount of the impinging sound waves. The receiving diaphragm would appear to take in at least as much of the total quantity of the arriving sound energy as impinges upon its own surface, depending upon its size. The amount of sound energy taken in is even smaller, however, because the amplitudes of pressure occurring before the diaphragm partly evade the diaphragm by deviating laterally towards the flexible or soft wall and thus do not transfer all their energy to the receiving diaphragm. The action brought about by stiffening the zone surrounding the receiving diaphragm is just the opposite to that just described. In the whole area of the stiffened surface upon which the arriving sound waves impinge the receiving diaphragms are the only portions towards which the compressional sound waves can deviate and where they can subside and convert their pressure into energy of motion. Thus practically the entire amount of sound energy distributed over the said extended zone is collected and taken up by the comparatively small vibrating diaphragms and converted into useful energy by the microphones attached to them.

Figure 2:
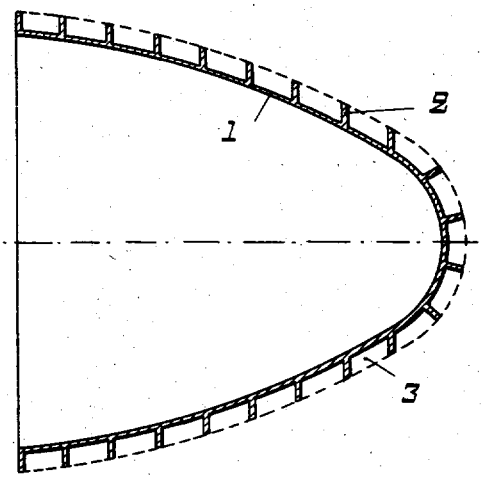
Fig. 2 shows a sound reflector whose reflecting wall is stiffened by ribs and in the interior of which a sound receiver is placed.

The stiffening of the parts of the buoy wall in the neighborhood of the receiving diaphragm through adding to their thickness naturally increases the weight of the buoy very considerably. In the case of a buoy of the kind shown, this produces a favorable effect by increasing the stability of the buoy, this being very desirable in order to prevent disturbances of the proper operation of the microphones. But, as a rule, increased weight in sound signaling plants should be avoided, or at any rate the weight should be kept as low as possible. How this can be accomplished in plants constructed in accordance with the invention is indicated in the following figures;

In Fig. 2 a reflector is shown which is constructed in accordance with the invention. If these reflectors were made of solid strong material such as metal they would be so thick that their weight would be too large for practical use. But if, in accordance with the invention, they are provided with stiffening ribs extending longitudinally and cross-wise, their weight will only be a fraction of the weight of a solid reflector.

The preferable form of rib is comparatively narrow and it is stood up on edge on the surface of the reflector. In the case of reflectors constructed in this manner the surface of the reflector is thus divided by the stiffening members into a series of individual panels or spaces.

The constructional form of the invention shown in the drawing in Fig. 2 is a stiffened parabolic reflector in longitudinal axial section. The body 1 of the reflector is provided with transverse ribs 2 that extend round the body in circles. Besides the circular or transverse ribs there are longitudinal ribs 3.

The application of the invention to submarine signaling plants on ships is, of course, one of special importance. One method in particular of mounting sound signaling apparatus has hitherto been found to give good practical results; this method consisting in placing the apparatus in a water tank arranged on the inside of the hull of the ship. This invention enables another method of arranging the apparatus to be employed that requires less space and weight, whilst giving an efficiency at least as high as that of the known method.

The manner in which the invention enables this to be done can be easily explained by reference to a sound producer: If, for example, a tuning fork is attached at its foot to an ordinary ship's hull and then struck, only a very small area or zone surrounding the foot of the fork will be caused to vibrate. The rises and drops of the pressure in the water abutting against or situated before the said zone, i. e., the sound propagated in the water, after travelling a distance of only a few centimeters, will strike upon neighboring portions of the hull, which are not vibrated by the positive action of the sound producer or tuning fork and which, on account of the comparative thinness of the hull, are soft or flexible and thus give way to the successive rises and drops of pressure in the water abutting against them. Hence in such a case it is impossible to produce appreciable amplitudes of pressure at the point of orgin of the sound (that is, at the sound radiating member) and to cause energy to be properly radiated from it. In accordance with the present invention the area surrounding the foot of the tuning fork is stiffened to a distance amounting to about a half a length of the wave of the sound in question in such a manner that all yielding to the fluctuations of pressure is obviated. This stiffening of the plate can easily be accomplished without excessive addition to its weight by attaching radial and preferably ramifying ribs to its surface. Of course in cases in which the weight is of no moment the zone in question can be thickened throughout its entire area.

In Figs. 3 and 4 a constructional form of an arrangement according to the invention and as foreshadowed in the two preceding paragraphs is shown in section and front elevation. The zone $a$ of the hull surrounding the tuning fork S is vibrated by the fork and caused to execute oscillations of the kind usually carried out by diaphragms. Rises and drops of the pressure within a zone defined by the radius $b$ have no chance of becoming dissipated by deviating to any yielding spots because the stiffening members $d$, $d$ eliminate any such spots in the hull. The best possible effect is obtained if $b$ is made equal to half a wave length of the sound employed, but satisfactory results will also be accomplished if $b$ is made one quarter of the said wave length so as to obtain sizes that are more convenient for practical purposes.

In an arrangement of this kind only the zone $a$ vibrates in the manner of a sound emitting or receiving diaphragm whilst the remaining stiffened portion remains perfectly still. In many cases, however, it is desirable to utilize the whole area defined by a radius of half a wave length, or perhaps a quarter of the wave length as the case may be, as a radiating member, for the amount of energy radiated depends upon the size of the radiating surface. But it is extremely difficult to excite such large surfaces (about 1½ yds. in diameter) in such a manner as to cause them to execute their fundamental form of vibration. And, if harmonics are produced there will be parts in the surface of the diaphragm or plate that vibrate in opposite directions at one end and the same movement so that pressure set up in the water by sound at one point will be dissipated at another point.

How these undesirable vibrations may be eliminated according to the present invention is illustrated in Fig. 5. The stiffening members $d$, $d$, attached to the hull are, in this case, not of the same height from the wall at all parts of their length but gradually become lower and lower towards their ends, whilst the hull is thickened considerably at the point where the moving force is applied. By this means all parts of the stiffened zone $b$, $b$ are compelled to swing in phase with each other and the vibrations of the stiffened zone are caused to be similar in character to the fundamental oscillations of a diaphragm. The rate of vibration of the stiffened zone is that of the vibrating force applied to it. In Fig. 5 an electro-magnetic sound producing and receiving apparatus $S^1$ is used instead of the tuning fork shown in Fig. 3.

The construction of a vibrating zone of this kind may also be such that it is quite stiff towards the middle but softer or more flexible at its periphery, the points of attachment between the sending or receiving apparatus and the vibrated or vibrating plate then being nearer the periphery.

An arrangement of this kind is shown in Fig. 6. The stiffening members $d$ herein are not of the same size at all points but decrease in height as they approach the periphery of the plate, a margin at the periphery being left unstiffened. The points $p$, $p$ at which the sound signaling apparatus proper (which in this case is an electromagnetic sender) is coupled to the plate, are located near the unstiffened or soft margin. The whole vibrating zone is surrounded by a ring or annular protuberance $r$, $r$ that forms the boundary of the zone.

By this arrangement an advantageous transformation of the amplitudes may be obtained within the vibrating plate itself.

Of course stiffened zones of this kind in the hull can also be produced by inserting previously prepared plates of the kind described in the hull, or by attaching them thereto.

The difference in the manner of operation between the vibrating plates shown in Figs. 5 and 6 consists chiefly in the fact that in plates of the former kind, in which the flexible parts are in the centre and at the periphery, the whole area of the plate in vibrating forms cone-shaped bulges, whilst plates of the latter kind, due to the stiffening ribs being chamfered down towards the periphery form bulges whilst vibrating that are shaped more like the fundamental vibrations of an oscillating diaphragm.

The invention may also be used to advantage in cases in which a vibrating plate or wall is to be mounted within a ship near the hull and the space between the hull and the plate is to be filled with liquid. The operation of the known arrangement of a tank filled with liquid and attached to the inner wall of the hull will thus be considerably improved; and besides the tank may then be made much flatter, because a large amount of the liquid required for obtaining good results can be dispensed with when a wall that is itself inflexible to sound is used. The shape and measurements of the plate combined with a tank are governed by the same considerations as those which apply to a plate inserted in, or attached to, the hull itself.

An arrangement of the kind foreshadowed in the previous paragraph is diagrammatically illustrated in section in Fig. 7, in which 1 is the hull of a ship, 4 is the plate equipped with stiffening members 3, and 5 is an electromagnetic vibrator of any desired kind. 2 is the liquid interposed between the hull and the vibrating plate.

Since rubber sealing elements or packing are generally used in constructing these tanks and fixing them to the hull, provision must be made for preventing derogations of the advantageous effect of the invention through the amplitudes of pressure produced in the water by sound being partly dissipated by the packings that are soft and hence yield to the said pressure. This can be most easily accomplished by interposing sound throttling elements between the region of sound and the packings as indicated in the sectional representation of Fig. 8 in which the signs of reference used correspond to those of Fig. 7. The ring 6 that supports the diaphragm 4 is provided with lips 7 that extend to the surface of the hull and the diaphragm respectively, the lips being of such size and so arranged as to leave only a very small gap or space between them and the hull and plate. These gaps or spaces exert the throttling effect. On account of the elasticity of the rubber packings the lips may, if desired, even be pressed close up against the hull and the diaphragm.

The vibrating plate arrangement shown in Figs. 7 and 8 is preferable to that of Figs. 5 and 6 because the attachment of stiffening members to the hull itself, or a sufficiently tight insertion in the hull of special plates made in accordance with the invention, is often fraught with great difficulties.

As far as the invention is concerned the design of the sound receiver or producer itself is a matter of indifference. Any type of sound signaling apparatus may be used in connection with a vibrating diaphragm, plate, or wall constructed in accordance with the invention.

In Fig. 9 a device is shown which is closely related to those already described and in which the application of the invention produces very favorable results. This device resembles the known arrangement in which a liquid containing tank having a sound signaling apparatus proper submerged therein is attached to the interior of a ship's hull. To prevent the energy of the pressure fluctuations set up in the water by the sound from escaping or being dissipated in the relatively soft sheet metal walls of the tank, it is necessary to use very large tanks the measurements of which exceed a wave length of the sound employed. This escape or dissipation of the sound energy can also be prevented while using smaller tanks if the walls of the tanks are thickened or stiffened in accordance with the invention.

In the drawing a vertical section of an arrangement of this kind is shown in which 1 is the hull, 2 the wall of the tank, and 3 a submerged sound signaling apparatus of any approved type. In the illustrated constructional form the tank wall is stiffened by longitudinal and transverse ribs 4 and 5. If a round tank is used the form of the stiffening ribs will preferably be circular and radial. It would also suffice to use a tank with a wall of such thickness, or having thick parts so arranged, that all the natural rates of vibration of the wall lie higher than the frequency of vibration of the sound employed.

What the size of the tank would be if an unstiffened wall were used, and if an approximately equal efficiency is to be obtained, is indicated in the drawing by broken lines, the measurements being given in wavelengths $l$.

If the standard rate of vibration of 1000 per second is the frequency of the sound used for signaling, a proper sized tank as usually employed having soft or flexible sheet metal walls, whose measurements amount to about a wave length, would weigh more than a ton. If the walls of the tank are constructed in accordance with the invention it can generally be made as flat or shallow as desired, so that its depth need only be such as will allow sufficient space for a sound receiving box a few centimetres thick. The weight of the tank will thus be reduced to perhaps a twentieth of the aforesaid figure. In connection with all of the arrangements hereinbefore described, in which the requisite inflexibility or hardness to sound of the wall or diaphragm is obtained by attaching stiffening ribs thereto, it should be observed that the stiffening elements must not be spread over the surface without regard to the function to be performed by them. The stiffening elements or ribs must be so arranged and their number must be such that none of the bays or panels bounded by the ribs has a rate of vibration that is equal to, or below, the rate of vibration of the sound employed for signaling. This, of course, also applies to the parts of such sound signaling plants as are shown in Fig. 2, where the ribs on the surface of the reflector extend both circularly, or parallel to the mouth of the reflector, and along lines determined by axial sections through the reflector.

Fig. 10 shows by way of example a round plate P divided into bays $f, f$ by stiffening ribs $r, r$ and rings R, R applied in accordance with the invention.

The individual spaces or bays $f, f$ bounded by the stiffening ribs may each be considered to represent a vibrating plate rigidly held at its periphery. Each of these individual plates has a natural rate of vibration that is peculiar to itself and which, apart from the coefficient of elasticity of the material, is determined by the thickness and area of the individual plate or bay. If the natural rate of vibration of any such bay is low compared to the vibrations of the signaling note, this bay will be excited by this note and caused to execute vibrations of very large amplitude, i. e., the bay will yield readily to the compressional waves in the water and will act like a flexible or soft wall, thus converting a considerable part of the pressure amplitudes into motion, so that the effect of these amplitudes is diverted from the sound receiving apparatus proper to the soft part of the plate that acts as a diverting element. But if the bay is made so small or so thick, having in mind the elastic force of the material, that its natural rate of vibration is higher than the signaling frequency, the amplitudes of the vibrations that it may be compelled to execute by the action of the compressional sound waves thereon will be very small, and the amount of pressure that is converted into motion, and that is thus diverted from the sound signaling apparatus or receiver, is only very small.

In cases in which for some reason or another, it is not convenient or possible to thicken the particular part of the wall or diaphragm in question directly, recourse may be had to the expedient of placing a certain amount of practically incompressible medium behind the part to be stiffened. This applies more especially to arrangements, for example, of the kind illustrated in Figs. 3 and 4. Instead of attaching radial ribs to the hull in the neighborhood of the vibrating portion as shown in these figures or in the neighborhood of a separate vibrating diaphragm, the vibrating portion or diaphragm may be surrounded by an annular water tank.

The ring-shaped water tank forms a perfect substitute for the said stiffening elements, because deviations of the compressional waves are impossible in water of sufficient depth. The advantage offered by this arrangement is that it is easier to carry out than the stiffening elements and is always sure to act.

One of the most advantageous constructional forms of this type is shown in Fig. 11. A diaphragm $m$ is inserted in the hull $b$ of a ship and a vibrating structure such as a tuning fork $g$ is attached to the diaphragm. The device shown is intended to act as a receiver and is therefore equipped with a microphone $c$. Surrounding the diaphragm $m$ is an annular water vessel $f$ that is attached to the hull $b$. The dimension of the tank in the direction perpendicular to the hull is preferably made equal to half a wave length of the sound used for signaling, but a smaller depth will also be sufficient to considerably improve the efficiency of the plant.

In Fig. 12 a self-explanatory modification of the arrangement of Fig. 11 is shown in which similar signs of reference are used to designate similar parts. In these two plants the diaphragm itself is also stiffened by ribs $i$ in the before-described manner.

It is evident that the type of the sound receiving or sound producing aparatus itself that is employed is a matter of indifference as far as the invention is concerned. This follows from the fact that the object of the invention is to produce the conditions required for obtaining a surface or field from which sound is taken up or emitted with the least possible loss. It is not necessary to use only one of the said stiffening means in any of the aforedescribed or other arrangements, for any desired combination of these or other equivalent means, or any substitute therefor, may be used according to the particular operating conditions involved or to the conditions under which the apparatus is to be installed. It is obvious that the application of stiffening means according to the invention is of great advantage not only in signaling plants but also in other cases, when sound waves of any kind travelling in fluids are to be received or produced, for example, for detecting noises made by ships or the like.

The term "sound signaling apparatus," as used in the claims, is intended to include senders, receivers, and reflectors, and other analogous apparatus.

I claim:

1. In a submarine sound signaling plant sound signaling apparatus proper, and a wall associated with the said apparatus, an area of the said wall of a radius of at least substantially one quarter of the length of the wave of the sound used for signaling being substantially unyielding to fluctuations of pressure due to the said sound.

2. In a submarine sound signaling plant, sound signaling apparatus proper, a wall associated with the said apparatus, and stiffening means for rendering substantially inflexible to sound waves of certain wave lengths an area of the said wall having a radius of at least substantially one quarter of the length of the said sound waves.

3. In submarine sound signaling apparatus, in combination, sound radiating means in sound communication with the liquid, and a surface having a radius of at least substantially one quarter of the wave length of the sound signal employed encompassing the central point of sound radiation, said surface being sufficiently rigid as to respond at most only substantially as a unit to the pressure fluctuations of the sound waves employed.

4. In submarine sound signaling apparatus, in combination, sound radiating means in sound communication with the liq uid, and a surface encompassing the central point of sound radiation, said surface having means associated therewith adapted to make it responsive at most only substantially as a unit to the pressure fluctuations of the sound waves employed.

5. In a submarine sound signaling plant, the combination of a surface having a radius equal to at least substantially one quarter of the length of the waves of the sound employed for signaling whose parts are substantially inflexible to the said sound waves, and a sound signaling apparatus proper associated with the central portion of the said surface.

6. In a submarine sound signaling plant, the combination of a wall, a radiating surface held by the said wall, and sound signaling apparatus proper co-operating with the said radiating surface, the area of the said wall that is within a zone having a radius of at least substantially a quarter of the length of the waves of the sound employed for signaling being substantially inflexible to these waves.

7. In a submarine sound signaling plant, the combination of a wall, a radiating surface whose parts are substantially inflexible to sound waves of the length employed for signaling, the radiating surface being held by the said wall and adapted to vibrate as a whole in response to the said sound waves, the area of the said wall that is within a zone having a radius of at least substantially a quarter of the length of the said sound waves being substantially inflexible to these waves, and sound signaling apparatus proper co-operating with the said radiating surface.

8. In submarine sound signaling apparatus, the combination of a sound signaling apparatus proper, and a surface associated with the said apparatus that is substantially inflexible to sound waves of the length employed for signaling, the inflexible area covering a zone having a radius of at least substantially a quarter of the said wave length.

9. In combination with a ship's hull, a sound signaling apparatus in vibratory communication therewith, and means for rendering substantially inflexible to the sound waves employed for signaling the parts of the hull within a zone having a radius of at least substantially a quarter of a wave length of the said sound.

10. In a submarine sound signaling plant, sound signaling apparatus proper, a wall associated with the said apparatus, and stiffening ribs situated on an area of the said wall and rendering it substantially inflexible to the sound waves employed for signaling, the said area having a radius equal to at least substantially one quarter of the length of the said sound waves.

11. In a submarine sound signaling plant, a wall, stiffening ribs situated on an area of the said wall and rendering it substantially inflexible to the sound waves employed for signaling, the said area having a radius equal to at least substantially one quarter of the length of the said sound waves, and sound signaling apparatus proper associated with the central portion of the said stiffened area.

12. In a submarine sound signaling plant, sound signaling apparatus proper, and a wall of a liquid containing device associated with the said apparatus, an area of the said wall of a radius of at least substantially one quarter of the length of the wave of the sound used for signaling being substantially unyielding to fluctuations of pressure due to the said sound.

13. In a submarine sound signaling plant the combination of a wall, a radiating surface, primary stiffening ribs situated on the radiating surface and rendering its parts substantially inflexible to sound waves of the length employed for signaling, the radiating surface being held by the said wall and adapted to vibrate as a whole in response to the said sound waves, an area of the said wall within a certain zone being provided with secondary stiffening means that render the said area inflexible to the said sound waves, the said zone having a radius of at least substantially a quarter of the length of the said sound waves, and sound signaling apparatus proper co-operating with the said radiating surface.

14. In a submarine sound signaling plant, a plate, stiffening ribs on the said plate subdividing the same into portions so designed that their natural rates of vibration are higher than that of the sound used for signaling, and a sound signaling apparatus associated with the said plate.

15. In combination with the shell of a floating vessel, sound signaling apparatus, a plate secured to the shell having a radius equal to at least substantially a quarter of the length of the wave of the sound used for signaling, and liquid interposed between the plate and the said shell, the plate being so designed that its parts are substantially unyielding to fluctuations of pressure due to the said sound.

16. In combination with the shell of a floating vessel, sound signaling apparatus, a plate secured to the shell having a radius equal to at least substantially a quarter of the length of the wave of the sound used for signaling and adapted to vibrate as a whole in response to the said sound waves, and a liquid interposed between the plate and the said shell, the plate being such that its parts are substantially unyielding to fluctuations of pressure due to the said sound.

17. In combination with the shell of a floating vessel, sound signaling apparatus, a plate secured to the shell having a radius equal to at least substantially a quarter of the length of the wave of the sound used for signaling, liquid interposed between the plate and the said wall, and stiffening ribs attached to said plate and extending radially from the centre of the said plate, whereby its parts are rendered substantially unyielding to fluctuations of pressure due to the said sound.

In testimony whereof I have affixed my signature in presence of two witnesses.

WALTER HAHNEMANN.

Witnesses:
  LEONARD ADELMANN,
  ANNA MILLER.